(12) United States Patent
Hepner et al.

(10) Patent No.: US 6,587,962 B1
(45) Date of Patent: Jul. 1, 2003

(54) WRITE REQUEST PROTECTION UPON FAILURE IN A MULTI-COMPUTER SYSTEM

(75) Inventors: Dan Hepner, Saratoga, CA (US); Eric Tausheck, Citrus Heights, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/421,496

(22) Filed: Oct. 20, 1999

(51) Int. Cl.[7] .............................................. G06F 11/00
(52) U.S. Cl. ...................................................... 714/19
(58) Field of Search ............................. 714/4, 19, 20, 714/21, 10, 42; 711/150

(56) References Cited

U.S. PATENT DOCUMENTS

| | | | | |
|---|---|---|---|---|
| 4,325,116 A | * | 4/1982 | Kranz et al. | 711/151 |
| 4,819,159 A | * | 4/1989 | Shipley et al. | 714/19 |
| 5,065,354 A | * | 11/1991 | Jons et al. | 714/5 |
| 5,140,689 A | * | 8/1992 | Kobayashi | 714/20 |
| 5,197,148 A | * | 3/1993 | Blount et al. | 714/5 |
| 5,201,044 A | * | 4/1993 | Frey, Jr. et al. | 714/20 |
| 5,261,089 A | * | 11/1993 | Coleman et al. | 707/8 |
| 5,287,501 A | * | 2/1994 | Lomet | 707/202 |
| 5,412,788 A | * | 5/1995 | Collins et al. | 711/157 |
| 5,437,026 A | * | 7/1995 | Borman et al. | 707/202 |
| 5,463,733 A | * | 10/1995 | Forman et al. | 714/10 |

(List continued on next page.)

OTHER PUBLICATIONS

Pui Ng, "A Commit Protocol for Checkpointing Transactions", 1988, IEEE.*
Ahmed K. Ezzat, "Orphan Elimination in Distributed Object-Oriented Systems", 1990, IEEE.*
Fabio Panzieri and Santosh K Shrivastava, "Rajdoot: A Remote Procedure Call Mechanism Supporting Orphan Detection and Killing", 1988, IEEE.*
Microsoft Press Computer Dictionary Third Edition, 1997, Microsoft Press.*

Primary Examiner—Robert Beausoliel
Assistant Examiner—Gabriel L Chu

(57) ABSTRACT

Disclosed is a method for preventing ghost writes in a multi-computer system. A first computer in the multi-computer system issues one or more write requests to a storage device, each write request normally being effectuated after being pending for a time. The method generally comprises the steps of detecting a condition indicative of a failure associated with the first computer and preventing the effectuation of write requests issued by the first computer to the storage device and pending at the time of the detected condition. In one embodiment, the condition indicative of a failure associated with the first computer comprises at least one of the group consisting of a reduction in the number of known operating computers in the multi-computer system, and a state change of a volume group associated with the computer on the storage device from inaccessible to accessible and a reduction in the number of known operating computers in the multi-computer system. In another embodiment, the failure is a communication failure associated with one or more write requests to a storage device connected along a plurality of redundant communications channels. In another embodiment, the preventing step comprises at least one action from the group consisting of issuing a fiber channel target reset on a fiber channel connected to the storage device, issuing a fiber channel remote logout on a fiber channel connected to the storage device, issuing a fiber channel remote logout and a requiring logout from multiple fiber channels on a fiber channel connected to the storage device, and issuing a bus device reset on a bus connected to the storage device. Also disclosed are computer software, embedded on a computer readable medium, comprising instructions for implementing the methods; and apparatus to implement the method.

21 Claims, 2 Drawing Sheets

U.S. PATENT DOCUMENTS

| | | | | |
|---|---|---|---|---|
| 5,481,699 A | * | 1/1996 | Saether | 714/15 |
| 5,550,973 A | * | 8/1996 | Forman et al. | 714/10 |
| 5,623,625 A | * | 4/1997 | Thompson et al. | 711/113 |
| 5,761,731 A | * | 6/1998 | Van Doren et al. | 711/155 |
| 5,764,659 A | * | 6/1998 | Tanio | 714/805 |
| 5,764,903 A | * | 6/1998 | Yu | 709/208 |
| 5,796,934 A | * | 8/1998 | Bhanot et al. | 714/4 |
| 5,829,019 A | * | 10/1998 | Thompson et al. | 711/113 |
| 5,850,507 A | * | 12/1998 | Ngai et al. | 714/16 |
| 6,078,745 A | * | 6/2000 | DeGreef et al. | 717/151 |
| 6,141,769 A | * | 10/2000 | Petivan et al. | 714/10 |
| 6,182,241 B1 | * | 1/2001 | Ngai et al. | 714/16 |
| 6,260,125 B1 | * | 7/2001 | McDowell | 711/162 |
| 6,321,350 B1 | * | 11/2001 | Baskey et al. | 714/704 |
| 6,345,331 B1 | * | 2/2002 | Fuente | 710/72 |
| 6,401,223 B1 | * | 6/2002 | DePenning | 714/42 |

* cited by examiner ated are altered so as to eliminate
WRITE REQUEST PROTECTION UPON FAILURE IN A MULTI-COMPUTER SYSTEM

TECHNICAL FIELD

The invention relates to multi-computer systems. More particularly, the invention relates to methods and equipment for recovery processing in the event of a computer failure.

BACKGROUND ART

Multi-computer systems employ a plurality of computers. A single computer runs a single kernel, whereas a multi-computer runs multiple kernels. As so defined, a single computer may include one or many processors. The constituent computers in a multi-computer may be in distinct physical units (e.g., chassis or circuit boards) or individual processors together in the same physical unit or some combination of both. One example of a multi-computer system is one in which redundant computers are present. The use of redundant devices in computer systems is advantageous in critical applications because the redundant devices increase system availability, survivability, and robustness. In a multi-computer systems one or more computers may be redundant computers able to take over processing workload abandoned by a primary computer that has failed. A redundant computer may be connected to peripheral storage devices (e.g., disk drives) through separate hardware paths than used to connect a primary computer to the peripheral storage devices. A redundant computer may be inactive unless and until the primary computer fails. Alternatively, multiple active computers in the same scalable computer system may be redundant with respect to each other in the sense that one of the computers can takeover execution of an application program (also called simply "application") originally executed by computer that subsequently fails.

A computer stores data to peripheral storage by issuing one or more "write requests" (sometimes simply referred to as a "writes") to a peripheral storage device. Typically write operations are asynchronous, i.e., the computer issues a write request and is notified of its completion some time later. A busy computer may have multiple writes outstanding at the same time. Once issued, a write request may be delayed, perhaps indefinitely. Sources of indefinite delay include failure of communications channels between the computer and the storage device, and failures within the storage device itself. Normally, a computer "times out" such writes and reissues them if necessary. Failing receipt of a write completion acknowledgment, the requesting computer typically records the failed state of the peripheral storage device. When an operating computer fails, it may have pending writes that have been issued but neither completed nor timed-out. When a pending write requests from a failed computer is effectuated (i.e., actually written on a storage device), the phenomena is referred to herein as a "ghost write." That is, a ghost write is effectuated on behalf of a dead computer.

A ghost write may seriously interfere with recovery processing whereby a redundant computer takes over for the failed computer. When an operating computer fails, a recovery routine is executed to transfer application programs (also called, more simply, "applications") to a redundant computer. An application is typically terminated and then restarted on the redundant computer. Recovery of an application following unexpected termination usually involves reading peripheral storage utilized by the application and analyzing the data to determine the state of the application program at the time of the failure. If necessary, the state of the peripheral storage devices is altered so as to eliminate partially completed writes. The objective of the alteration is to back up in time to a known good, consistent state, because partially completed writes place the storage devices contents into an inconsistent state. A ghost writes can interfere with the recovery processing by either (1) corrupting the data read from the peripheral storage or (2) overwriting corrections made for the purpose of restoring consistency.

SUMMARY OF INVENTION

In one respect, the invention is a method for preventing ghost writes in a multi-computer system. A first computer in the multi-computer system issues one or more write requests to a storage device, each write request normally being effectuated after being pending for a time. The method generally comprises the steps of detecting a condition indicative of a failure associated with the first computer and preventing the effectuation of write requests issued by the first computer to the storage device and pending at the time of the detected condition. In one embodiment, the condition indicative of a failure associated with the first computer comprises at least one of the group consisting of a reduction in the number of known operating computers in the multi-computer system, and a state change of a volume group associated with the computer on the storage device from inaccessible to accessible and a reduction in the number of known operating computers in the multi-computer system. In another embodiment, the failure is a communication failure associated with one or more write requests to a storage device connected along a plurality of redundant communications channels. In yet another embodiment, the preventing step comprises at least one action from the group consisting of issuing a fibre channel target reset on a fiber channel connected to the storage device, issuing a fibre channel remote logout on a fiber channel connected to the storage device, issuing a fibre channel remote logout and a requiring logout from multiple fibre channels on a fiber channel connected to the storage device, and issuing a bus device reset on a bus connected to the storage device.

In other respects, the invention is computer software embedded on a computer readable medium. The computer software comprises instructions for implementing the methods just summarized.

In yet another respect, the invention is an apparatus. The apparatus comprises a first computer, a storage device, at least one adapter connected between the first computer and the storage device, and an application executing on the first computer. The adapter comprises a protocol capable of selectively eliminating write requests issued to the storage device before effectuation of the selected write requests. The application comprises an activation procedure that executes upon startup of the application. The activation procedure is connected to the adapter and commands the adapter to eliminate uneffectuated write requests. In one embodiment, the activation procedure executes following at least one event from the group consisting of a reduction in the number of known operating computers in the multi-computer system, and a state change of a volume group associated with the computer on the storage device from inaccessible to accessible and a reduction in the number of known operating computers in the multi-computer system. In another embodiment, the activation procedure performs at least one action from the group consisting of issuing a fibre channel target reset on a fiber channel connected to the storage device, issuing a fibre channel remote logout on a fiber channel connected to the storage device, issuing a fibre channel remote logout and a requiring logout from multiple fibre channels on a fiber channel connected to the storage device, and issuing a bus device reset on a bus connected to the storage device.

In comparison to the prior art, certain embodiments of the present invention are capable of achieving certain advantages, including the ability to recover more satisfactorily from a computer failure when there is the potential for ghost writes.

Those skilled in the art will appreciate these and other advantages and benefits of various embodiments of the invention upon reading the following detailed description of a preferred embodiment with reference to the drawings.

DETAILED DESCRIPTION OF A PREFERRED EMBODIMENT

Figure 1:
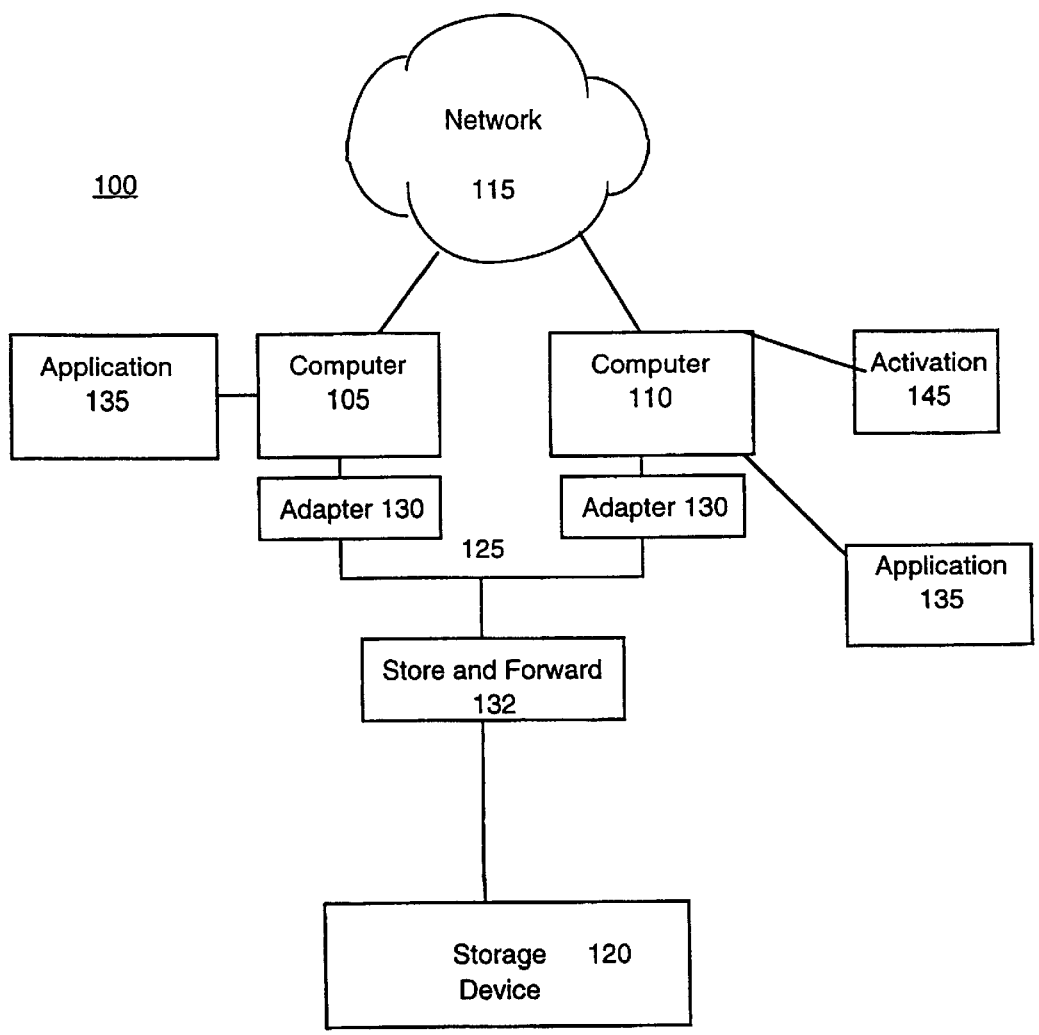
FIG. 1 is a block diagram of a multi-computer system having redundant computers.

FIG. 1 is a block diagram of a multi-computer system 100 having redundant computers 105 and 110. The computer 110, for example, may be a redundant to computer 105, which is a primary computer for a given application. In one configuration, the redundant computer 110 is not active until the primary computer 105 fails. In another configuration, both computers 105 and 110 are initially active, and upon failure of the computer 105, the computer 110 takes over one or more applications that had been executing on the computer 105. The computers 105 and 110 communicate with one another via a network 115. Additional computers not shown in FIG. 1 can also be present and connected to the network 115. The network 115 can be, for example, a cluster. The computers 105 and 110 are connected to a storage device 120, which is shared between the multiple computers in the multi-computer system 100. The storage device 120 can be a peripheral storage device, such as a disk drive, or an array of storage devices, for example. The storage device 120 is connected to the computers 105 and 110 by a communication channel 125. The communication channel 125 can be a SCSI (small computer systems interface) bus or a fibre channel connection, for example. Each of the computers 105 and 110 interface to the communication channel 125 through an adapter 130. The adapter 130 executes the I/O (input/output) protocol appropriate for the communication channel 125. The adapter 130 may be separate from its associated computer (as shown in FIG. 1) or part of the its associated computer (i.e., within computers 105 or 110). The storage device 120 may also be associated with an adapter (not shown). Within the communication channel 125 is, optionally, a store and forward node 132, which is utilized in routing traffic along the communication channel 125 and/or otherwise managing traffic flow along the communication channel 125. Depending upon the nature of the communication channel 125, the store and forward node 132 may be optional or necessarily absent.

The storage device 120 is preferably logically divided into several logical volumes. A logical volume is also called a "volume group" herein. A volume group is a group of physical spaces on the storage device 120 that the multi-computer system 100 can manage as a single entity, much like a single separate physical storage device. When the storage device 120 is actually an array of storage devices, a volume group may be a set of one or more constituent storage devices logically grouped together to be treated like a single device. A volume group can be created for each application.

An application 135 executes on the computer 105, which is a primary computer for the application 135. The application 135 is a set of instructions (i.e., program, module, script or the like) that performs a useful task, such a accounting or flight simulation, for example. The application 135 is illustrated in FIG. 1 as being connected to the computer 105 in a first instance and connected to the computer 110 in a second instance. As used herein with regard to applications or other programs, the term "connected" means "interfaced to" or "interacting with" in the broadest sense, including the case of being executed by a specific hardware component.

The application 135 is associated with a volume group (not shown), which the application 135 accesses when accessing the storage device 120. Although the volume group is illustrated in FIG. 1 as being within the storage device 120, the extent of the volume group may equal or exceed that of the storage device 120. That is, the volume group may encompass some or all of the entire storage device 120, distinct storage devices (if any) constituting the storage device 120, and/or other storage devices not shown. The application 135, among other things, issues writes to the volume group on the storage device 120, and such writes in the normal course of operation are completed after some small delay and the computer 105 is notified of the completion of each write. However, in the event that the computer 105 fails before it receives completion acknowledgment of one or more writes, then those write requests are considered "ghost writes" or "orphan writes." The computer 105, which created these write requests, has died, and the write requests should now be killed so that the application 135 can be recovered and resume operation on its redundant computer, the computer 110. If a ghost write were allowed to be effectuated, then the computer 110, upon taking over execution of the application 135, would have no record of the write having happened, in which case the ghost write, like a ghost in the machine, would have altered the storage device 120 unbeknownst to the computer 110.

When the computer 110 detects that the computer 105 has failed, the computer 110 begins to execute an activation procedure 145 for the application 135. The activation procedure 145 establishes the application 135 as an executing program on the computer 110. The activation procedure 145 may be a subprogram within the application 135 or a separate program. The activation procedure 145 generally analyzes the state of data from the application 135 and executes reparation algorithms to roll back or undo partially completed work as well as perhaps recalculating some data. As part of its processing, the activation procedure 145 activates the volume group for use by the computer 110. Before such activation of the volume group, the computer 110 cannot access the volume group. That is, the volume group is inaccessible to the computer 110 until the activation procedure 145 makes it accessible.

Figure 2:
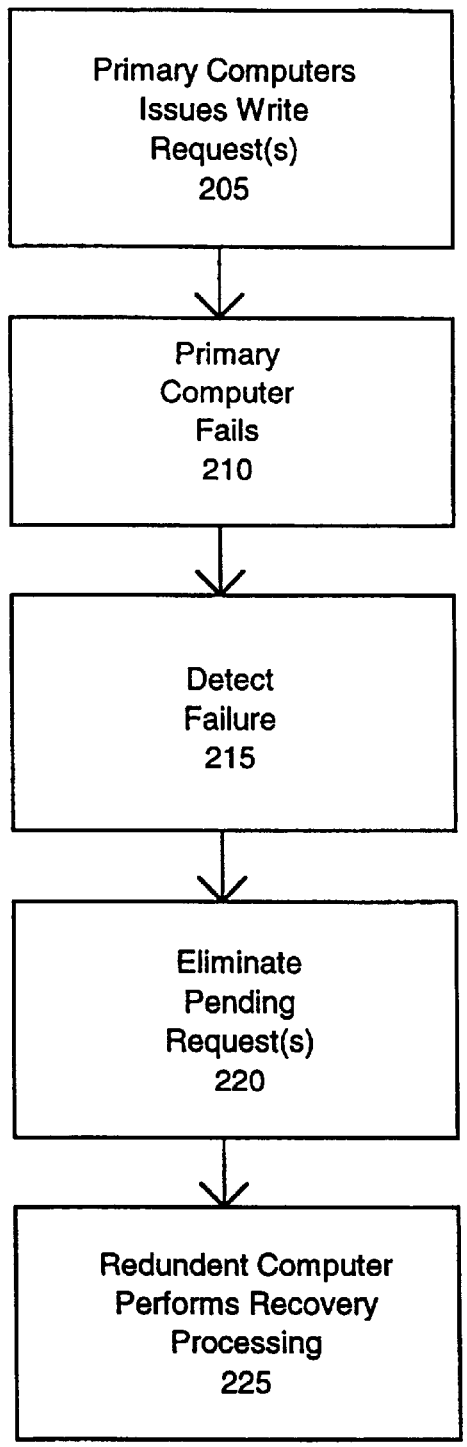
FIG. 2 is a flowchart of a method according to the invention and steps preceding the method.

FIG. 2 is a flowchart of a method 200 according to the invention and steps preceding the method 200. The method 200 will be described with reference to the system 100 (FIG. 1), as just described. As a first preceding step 205, the computer 105 issues one or more write requests to the storage device 120. The write requests might be delayed in the adapter 130, where the request might enter a queue, such as a FIFO (first in, first out) buffer. Alternately, a store and forward node can exist in the communication channel 125, and the write requests might be delayed in the store and forward node. Regardless of the specific mechanisms causing the delay, the write requests experience a delay before they are effectuated. During this period of delay, the computer 105 fails (210) or is affected by a failure. The failure may be an internal failure of the computer 105 or a communication failure between the computer 105 and the network 115 or the storage device 120. A particular failure mode is possible when the computer 105 is connected to the storage device 120 via multiple redundant communication channels. In such a case, a failure can result when there is a severely long delay in one of the multiple redundant communication channels, along which the computer 105 has transmitted a write request, such that the write request times out. In response to the timeout, the computer 105 assumes that the write request was not effectuated and may try to reissue the write request along another of the multiple redundant communications channels. If the first write request is effectuated after its lengthy delay, then it is a ghost write and can create an inconsistent state is between the computer 105 and the storage device 120. To generalize the many possible failures that can lead to ghost writes, the computer 105 fails or experiences some sort of related failure before completion of one or more outstanding write requests.

The method 200 commences by detecting (215) the failure. The failure may be detected (215) directly or indirectly. As a consequence of the failure, the method 200 responds in such a way that triggers the elimination of ghost writes. In one embodiment, the triggering condition is a request to change the volume group state, e.g., from inaccessible to accessible. Such a request may be made, for example, by the activation procedure 145 or the application program 135 running on the computer 110. In another embodiment, the triggering condition is a reduction in the set of known operating computers. The computers 105, 110, as well as any others connected to the network 115, are able to communicate with each other through the network 115. In this way, the computer 110 can detect when the computer 105 has failed, for example, and track the set of computers known to be operating, more generally. For example, the computer 110 can try for a certain amount of time to communicate with the computer 105. If this attempted communication "times out," then the network 115 reconfigures, e.g., forming a new cluster among the computer 110 and other active computers connected to the network 115. In another scenario, the computer 105 has experienced a communication failure rather than an internal failure. To cover both cases, the computer 105, if it is still operational, attempts to enter the newly formed cluster. If the computer 105 is unable to do so before a certain amount of time, then the computer 105 shuts itself off and ceases all activity. In yet another embodiment, the triggering condition is the conjunctive combination of both of the triggering events just described, e.g., a reduction in the number of known operating computers followed by a state change of the volume group.

In the next step 220, the method 200, prevents the ghost writes from being effectuated by deleting or otherwise eliminating the ghost write requests before they cause writing to the storage device 120. According to one embodiment, this is accomplished by deleting the ghost write requests from a queue in the adapter 130 or from a store and forward node along the communication channel 125. In an alternative embodiment, the aforementioned queue or store and forward node can implement a self deletion feature based on the age of the writes. For example, the aforementioned queue or store and forward node can keep track of the age of each write request in its contents and automatically discard those older than 4.75 seconds, for example. A computer that issued a discarded write can later reissue the request.

Because the store and forward node 132 is a potential source of delay, perhaps very long delays, for write requests, it is a potential source of ghost writes. For example, if the computer 105 issues a write request that is delayed long enough in the store and forward node 132 that the access times out, then the computer 105 will assume that the write request was not effectuated. If the write request is effectuated after the lengthy delay, then an inconsistency is created. If this happens after a failure of the computer 105, then it is a ghost write. The discarding of aged write requests can substantially lessen the probability and severity of such ghost writes.

The preventing step 220 may involve resets, forcible logouts and/or other actions on the communication channel 125, in response to which the storage device 120, adapter 130 (implementing an intelligent protocol), and/or the store and forward node 132 takes the appropriate action to delete, subsequently reject, or otherwise eliminate or abort the ghost writes. In one embodiment, the communications channel 125 is a SCSI bus and a hard reset on the SCSI bus signals that ghost writes should be eliminated. In another embodiment, the communications channel 125 is a fibre channel, and a targeted reset, targeted at the storage device 120, signals that ghost writes should be eliminated. Similarly, a third party remote logout or combination of third party remote logout and the requirement to logout from multiple fibre channels can signal on a fiber channel that all hosts (e.g., the processors 105 and 110) should be checked by forcing an interaction before accepting any new write requests. The forced interaction guarantees that the host is not dead. In yet another embodiment, a bus device reset, targeted at the storage device 120, signals that all hosts should be checked by forcing an interaction before accepting any new write requests.

In cases where the storage device 120 is a multiply connected storage device, such as an array of disk drives, the preventing step 220 can be augmented to better assure that the ghost writes are eliminated. In this case, the adapter 130, in response to a signal for the elimination of ghost writes at one connection, forwards the signal to some or all other connections. Alternatively or in addition, the signal for the elimination of ghost writes can be forwarded to the operating system of the multi-computer system 100.

The applications, procedures and other programs (e.g., the application 135, the activation procedure 145, protocols within the adapter 130 or the communication channel 125, and the operating system) in the multi-computer system 100 can be stored or embodied on a computer readable medium in a variety of formats, such as source code or executable code, for example. Computer readable mediums include both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the invention can be configured to receive and access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for use in a multi-computer system, wherein a first computer in the multi-computer system issues one or more write requests to a storage device, each write request normally being effectuated after being pending for a time, the method comprising:

storing issued write requests before the issued write requests are effectuated;

detecting a condition indicative of a failure associated with the first computer, wherein the condition comprises both a second computer requesting to change a state of a volume group associated with the first computer on the storage device from inaccessible to accessible and a reduction in the number of known operating computers in the multi-computer system;

preventing the effectuation of write requests issued by the first computer to the storage device and pending at the time of the detected condition; and deleting all the stored write requests that have been stored longer than a predetermined time.

2. The method of claim 1 wherein the failure is an internal failure of the first computer.

3. The method of claim 1 wherein the failure is a communication failure between the first computer and one or more other parts of the multi-computer system.

4. The method of claim 1 wherein the storage device is a disk drive.

5. The method of claim 1 wherein the first computer executes an application before the failure, the method further comprising:

activating the application on a second computer in the multi-computer system.

6. The method of claim 5 wherein the second computer is redundant to the first computer.

7. The method of claim 1 further comprising:

queuing an issued write request before the issued write request is effectuated; and wherein the preventing step comprises deleting all queued write requests.

8. The method of claim 1 wherein the storage device is connected to the multi-computer system via at least one SCSI bus.

9. The method of claim 1 wherein the storage device is connected to the multi-computer system via at least one fibre channel.

10. A method for use in a multi-computer system, wherein a first computer in the multi-computer system issues one or more write requests to a storage device, each write request normally being effectuated after being pending for a time, the method comprising detecting a condition indicative of a failure associated with the first computer; and preventing the effectuation of write requests issued by the first computer to the storage device and pending at the time of the detected condition, wherein the preventing step comprises at least one action from the group consisting of issuing a fibre channel target reset on a fiber channel connected to the storage device, issuing a fibre channel remote logout on a fiber channel connected to the storage device, issuing a fibre channel remote logout and requiring logout from multiple fibre channels on a fiber channel connected to the storage device, issuing a bus device reset on a bus connected to the storage device; and deleting all write requests that have been stored longer than a predetermined time.

11. The method of claim 10 wherein the multi-computer system includes an operating system, and the preventing step further comprises:

informing the operating system of the action.

12. The method of claim 10 wherein the storage device has a plurality of connections, and wherein the preventing step further comprises:

forwarding the action to at least one of the plurality of connections.

13. A computer readable medium on which is embedded a recovery program for use in a multi-computer system, wherein a first computer in the multicomputer issues one or more write requests to a storage device, each write request normally being effectuated after being pending for a time, the recovery program comprising:

one or more modules for detecting a failure associated with the first computer; and one or more modules for preventing the effectuation of write requests issued by the first computer to the storage device and pending at the time of the detected, wherein the preventing step comprises at least one action from the group consisting of issuing a fibre channel target reset on a fiber channel connected to the storage device, issuing a fibre channel remote logout on a fiber channel connected to the storage device, issuing a fibre channel remote logout and a requiring logout from multiple fibre channels on a fiber channel connected to the storage device, and issuing a bus device reset on a bus connected to the storage device.

14. A method for use in a multi-computer system, wherein a first computer in the multi-computer system issues a plurality of independent write requests to a storage device, each write request normally being effectuated after being pending for a time, the method comprising:

detecting a condition indicative of a failure associated with the first computer, and preventing effectuation of the plurality of independent write requests issued by the first computer to the storage device and pending at the time of the detected condition;

wherein the step of detecting a condition further comprises detecting a second computer requesting to change a state of a volume group associated with the first computer on the storage device from inaccessible to accessible.

15. The method of claim 14, further comprising:

storing each of the plurality of independent write requests that are pending in a queue; and wherein the step of preventing further comprises deleting the plurality of independent write requests from the queue.

16. A method for use in a multi-computer system, wherein a first computer in the multi-computer system is connected to a storage device by a plurality of communication channels and the first computer issues a plurality of independent write requests to the storage device, each write request normally being effectuated after being pending for a time, the method comprising:

detecting a condition indicative of a failure associated with the first computer, and preventing effectuation of the plurality of independent write requests issued by the first computer to the storage device and pending at the time of the detected condition;

wherein detecting a condition further comprises detecting failure of the first communication channel.

17. The method of claim 16, wherein the failure of the first communication channel comprises an extended delay of at least one transmission in the first communication channel.

18. A multi-computer system, wherein a first computer in the multi-computer system issues a plurality of independent write requests to a storage device, each write request normally being effectuated after being pending for a time, the system comprising:

means for detecting a condition indicative of a failure associated with the first computer, and means for preventing effectuation of the plurality of independent write requests issued by the first computer to the storage device and pending at the time of the detected condition;

wherein the means for detecting a condition further comprises means for detecting a second computer requesting to change a state of a volume group associated with the first computer on the storage device from inaccessible to accessible.

19. The system of claim 18, further comprising:

means for storing each of the plurality of independent write requests that are pending in a queue; and wherein the means for preventing further comprises means for deleting the plurality of independent write requests from the queue.

20. A multi-computer system, wherein a first computer in the multi-computer system is connected to a storage device by a plurality of communication channels and the first computer issues a plurality of independent write requests to the storage device, each write request normally being effectuated after being pending for a time, the system comprising:

means for detecting a condition indicative of a failure associated with the first computer, and means for preventing effectuation of the plurality of independent write requests issued by the first computer to the storage device and pending at the time of the detected condition;

wherein the means for detecting a condition further comprising means for detecting failure of the first communication channel.

21. The system of claim 20, wherein the failure of the first communication channel comprises an extended delay of at least one transmission in the first communication channel.

\* \* \* \* \*